United States Patent [19]
Clapp

[11] Patent Number: 5,313,394
[45] Date of Patent: May 17, 1994

[54] DOCUMENT ASSEMBLY CUSTOMIZATION SYSTEM FOR MODIFYING A SOURCE INSTRUMENT INCLUDING TEXT AND DECISIONAL COMMANDS

[76] Inventor: Barbara Clapp, 4 Flintlock Dr., Acton, Mass. 01720

[21] Appl. No.: 725,191

[22] Filed: Jul. 3, 1991

Related U.S. Application Data

[63] Continuation-in-part of Ser. No. 625,881, Dec. 11, 1990, abandoned.

[51] Int. Cl.[5] .............................................. G06F 15/21
[52] U.S. Cl. .................................. 364/419.1; 395/144
[58] Field of Search ..................................... 364/419.1; 395/144–146

Primary Examiner—Gail O. Hayes
Attorney, Agent, or Firm—Joseph S. Iandiorio

[57] ABSTRACT

A document assembly customization system for modifying a source instrument including text and decisional commands and their associated decisional clauses, including a function for indicating each decisional command and, its associated decisional clause in the instrument; a word processor for moving and deleting decisional commands and their associated decisional clauses; a function for generating a new template from the modified source instrument; and a decision index generator which generates a decision index identifying each decisional command and its associated decisional clause and their location in the text of the modified source instrument.

10 Claims, 7 Drawing Sheets

```
                              Source Instrument                    40
                    34
         42              SPECIAL POWER OF ATTORNEY       44
  46        48    48                       48         48    50
48      {Party's or Parties' Name(s) A1.1}, residing at {Street Address A1.3},  48
    {City A1.4}, [County A1.5] County, [State A1.6], do hereby appoint [Attorney's
    Name A2.1] of [Street Address A2.2], [City A2.3], [County A2.4] County, [State
    A2.5], [my/our IA1.2,3] attorney in fact to:
  62       66  64                                 68      70
  64 <REPEAT K3>   60
      {The following text is repeated for each piece of real estate being affected
  72  by the power of attorney. [Address K3,#]} 72
               74            48           50
        To grant, bargain, sell, and convey {my/our IA1.2,3} real property
    located at [Address K3,#], under the terms [with/without the taking back of a
    purchase money mortgage/deed of trust/specify type of mortgage or deed 5], and
    to collect and receive the proceeds from any such transaction.
  64 <FINISH REPEAT> 64
         76    82       80      86        84
  64 <CONDITION A3-a> 64
      {The following text will be included if this power of attorney is granted for
  72  a specific period of time. {Yes A3-a]} 72
                       48              48
        This power of attorney shall become effective on [Effective date A4],
    and shall terminate on [Expiration date A5].       88
  64 <END CONDITION> 64
       89
        Executed this ______________ day of ______________, ______________, at ______________, [State A1.6].
```

[Party's or Parties' Name(s) A1.1]

State of [State A1.6]
County of [County A1.5]

Select a document from the following list:

—Document Description

Simple Will
Special Power of Attorney
Testamentary Trust
Inter Vivos Trust
Marital Separation Agreement
Home Rental Agreement
Home Sales Agreement

Source Instrument 40

34 → SPECIAL POWER OF ATTORNEY

46 → 42 48 48 44 50
48 → [Party's or Parties' Name(s) A1.1], residing at [Street Address A1.3],
[City A1.4], [County A1.5] County, [State A1.6], do hereby appoint [Attorney's
Name A2.1] of [Street Address A2.2], [City A2.3], [County A2.4] County, [State
A2.5], [my/our 1A1.2,3] attorney in fact to:
62 — 66 68 70
64 — ⟨REPEAT K3⟩ 60
72 — {The following text is repeated for each piece of real estate being affected
by the power of attorney. [Address K3,#]} 72
74 48 48 50
To grant, bargain, sell, and convey [my/our 1A1.2,3] real property
located at [Address K3,#], under the terms [with/without the taking back of a
purchase money mortgage/deed of trust/specify type of mortgage or deed 5], and
to collect and receive the proceeds from any such transaction.
64 — ⟨FINISH REPEAT⟩ 64
76 82 80 86 84
64 — ⟨CONDITION A3-a⟩ 48
72 — {The following text will be included if this power of attorney is granted for
a specific period of time. [Yes A3-a]} 72
48
This power of attorney shall become effective on [Effective date A4],
and shall terminate on [Expiration date A5]. 88
64 — ⟨END CONDITION⟩ 64
89

Executed this ______ day of ______,

______, at ______, [State A1.6].

______________________________
[Party's or Parties' Name(s) A1.1]

State of [State A1.6]
County of [County A1.5]

FIG. 4

Modified Source Instrument
90

SPECIAL POWER OF ATTORNEY

64⟩CONDITION A3-a⟩ 64  80  84
{The following text will be included if this power of attorney is granted for
72 a specific period of time. [Yes A3-a]} 72    86

This power of attorney shall become effective on [Effective date A4],
and shall terminate on [Expiration date A5].  88
64⟩END CONDITION⟩ 64
      89

[Party's or Parties' Name(s) A1.1], residing at [Street Address A1.3],
[City A1.4], [County A1.5] County, [State A1.6], do hereby appoint [Attorney's
Name A2.1] of [Street Address A2.2], [City A2.3], [County A2.4] County, [State
A2.5], [my/our IA1.2,3] attorney in fact to:
                              68      70
64⟩REPEAT K3⟩ 64     60
  66
{The following text is repeated for each piece of real estate being affected
by the power of attorney. [Address K3,#]} 72
                   74
     To grant, bargain, sell, and convey [my/our IA1.2,3] real property
located at [Address K3,#], under the terms [with/without the taking back of a
purchase money mortgage/deed of trust/specify type of mortgage or deed 5], and
to collect and receive the proceeds from any such transaction.
64⟩FINISH REPEAT⟩ 64
   76

Executed this _________________ day of _________________,

_________________, at _________________, [State A1.6].

[Party's or Parties' Name(s) A1.1]

state of [State A1.6]
County of [County A1.5]

Template 100

SPECIAL POWER OF ATTORNEY

{The following text will be included if this power of attorney is granted for a specific period of time. [Yes A3-a]}

This power of attorney shall become effective on [Effective date A4], and shall terminate on [Expiration date A5].

[Party's or Parties' Name(s) A1.1], residing at [Street Address A1.3], [City A1.4], [County A1.5] County, [State A1.6], do hereby appoint [Attorney's Name A2.1] of [Street Address A2.2], [City A2.3], [County A2.4] County, [State A2.5], [my/our IA1.2,3] attorney in fact to:

{The following text is repeated for each piece of real estate being affected by the power of attorney. [Address K3,#]}

To grant, bargain, sell, and convey [my/our IA1.2,3] real property located at [Address K3,#], under the terms [with/without the taking back of a purchase money mortgage/deed of trust/specify type of mortgage or deed 5], and to collect and receive the proceeds from any such transaction.

Executed this _______ day of _______,

_______, at _______, [State A1.6].

_________________________
[Party's or Parties' Name(s) A1.1]

State of [State A1.6]
County of [County A1.5]

FIG. 5

DOCUMENT ASSEMBLY CUSTOMIZATION SYSTEM FOR MODIFYING A SOURCE INSTRUMENT INCLUDING TEXT AND DECISIONAL COMMANDS

RELATED APPLICATION

This application is a continuation-in-part of U.S. patent application Ser. No. 07/625,881 filed Dec. 11, 1990, now abandoned entitled "Interactive Computerized Document Assembly System", by the instant inventor.

FIELD OF INVENTION

This invention relates to a document assembly customization system.

BACKGROUND OF INVENTION

Conventional document editing systems are meeting with indifferent success, in part because they are not easily changed to accommodate the unique character of the user's needs. Attorneys, for example, frequently need to customize the text of the system template, or the question blanks that must be answered to complete the text or to complete decisional clauses such as conditional or repeat clauses. The questions may, for example, involve queries as to the names and addresses of parties or identification of property. The conditional clauses are those that are used or not used depending upon the answers to certain questions. Repeat clauses are those that can be repeated two or more times, also depending upon answers to question blanks. The text may be added to or deleted; questions and decisional clauses may be moved or deleted. In order to effect this customization, an "author package" must be purchased at added expense along with the editing system and, moreover, the customizing requires programming skills, for the customization must be done at the source level. Most users of document editing systems do not have those skills and even if they do, do not typically wish to become involved in complex computer programming operations in order to customize their document templates.

SUMMARY OF INVENTION

It is therefore an object of this invention to provide an improved, simpler and faster customization system.

It is a further object of this invention to provide such a system which enables a user to modify the document template without reprogramming the system.

It is a further object of this invention to provide such a system which enables document template modification easily by end users.

It is a further object of this invention to provide such a system which enables template modification involving addition, shifting or deletion of the text as well as moving or deleting the question blanks and decisional commands.

The invention results from the realization that a simple, easy-to-use document assembly customization system for modifying a source instrument can be achieved by using a word processor to move and delete decisional command clauses and automatically constructing a decision index which records the type and location of the decisional command clauses in the instrument.

This invention features a document assembly and customization system for modifying a source instrument including text and decisional commands. It includes means for indicating each decisional command in the instrument and means for moving and deleting decisional commands. There are means for generating a new template from the modified source instrument and means for generating a decision index identifying each decisional command and its location in the text of the modified source instrument.

In a preferred embodiment there may be further included means for adding and deleting words in the text. The source instrument may include question blanks to be answered and there may be further included means for indicating each question blank in the instrument and means for moving and deleting the question blanks. The means for indicating in each decisional command and clause may include first syntax symbol means accompanying each decisional command, and the means for indicating each question blank may include second syntax symbol means accompanying each question blank. The means for moving and deleting both the decisional commands and clauses in the question blanks may include a word processor. The first syntax symbol means may include a first component identifying a decisional command and a second component for selectively identifying the beginning and the end of the decisional command and clause, and identifying the command as one of a repeat clause or a conditional clause. The means for generating a decision index may include means for storing a representation of the second component identifying the beginning and the end of the decisional command and clause and whether it is a repeat or a conditional clause. The means for generating a decision index may further include means for recording in the text the offset position of the decisional command clause. The means for recording the offset position may define both the beginning and the end in the text of the decisional command clause represented by the decisional command.

BRIEF DESCRIPTION OF THE DRAWINGS

Other objects, features and advantages will occur to those skilled in the art from the following description of a preferred embodiment and the accompanying drawings, in which.

DESCRIPTION OF THE PREFERRED EMBODIMENTS

Normally a document editor or document assembly system is employed by a user such as an attorney to create a document by answering questions which appear on the screen of the host computer. These answers are later merged with the template to create the document. The template usually contains a number of questions that have to be answered, such as the names and addresses of parties, addresses of real estate and the like. There are also decisional commands that have to be responded to by the user attorney which will indicate whether or not certain clauses are to be used, known as conditional commands, and whether or not a certain clause should be repeated, known as a repeat command. These systems function well in limited use; however, occasionally the end user, such as the attorney finds it necessary to add, delete or move text within the template or to move or delete the decisional commands. At this point the task becomes a little more cumbersome, for now the user attorney must perform more like a software programmer than an attorney constructing a document. This can be a serious shortcoming when the attorney has neither the time or the expertise to perform the necessary programming tasks to modify the source instrument in order to obtain the template that he desires. This invention relates to a document assembly customization system which allows for a much easier and quicker modification of a source instrument, even by persons unskilled in the programming art. Such a document assembly customization system according to this invention can be used with a document assembly system such as disclosed in U.S. patent application Ser. No. 07/625,881 filed Dec. 11, 1990, entitled "Interactive Computerized Document Assembly System", by the instant inventor marketed under the trademark "AGILITY" available from RealWorld Solutions, Inc., One Kendall Square, Bldg. 200, Suite 2200, Cambridge, Mass. 02139.

The document assembly customization system according to this invention for modifying a source instrument including text and decisional commands and their associated decisional clauses includes some means for indicating each decisional command and its associated decisional clause in the instrument. This typically includes a first syntax symbol means. The first syntax symbol means may include a first component such as angle brackets which surround and identify the decisional command and a second component which selectively identifies the beginning and the end of the decisional command and its associated clause, and also identifies the command as one of a repeat clause or a conditional clause. For example, inside of the angle brackets at the beginning of the decisional clause may be the word "condition" or "repeat", which indicates both the start of the decisional command clause and the fact that it is either a conditional command clause or a repeat command clause, respectively. This second component also includes a pair of angle brackets positioned at the end of the decisional command clause, which contains another phrase such as "end" or "end condition" to signify the end of the conditional command clause or "finish" or "finish repeat" to indicate the end of the repeat command end clause. The user attorney uses the word processor to move and delete decisional commands and their associated decisional clauses. The word processor may also be used to move, delete and add material to the text itself. The word processor may be for example Word Perfect or Ami Pro. There are means for generating a new template from the modified source instrument and for generating a decision index which identifies each decisional command and its associated decisional clause, and its location in the text of the modified source instrument. The means for generating the new template and the decision index are accomplished in the software disclosed herein. The source instrument may also include, in addition to the decisional commands and clauses, question blanks which are to be answered by the user attorney, and there is further included means for indicating each question blank in the instrument and means for moving and deleting the question blanks. The question blanks may be indicated by a second syntax symbol means such as square brackets, and the moving and deleting of question blanks may be accomplished by the same, word processor. The software means for generating a decision index of this invention stores a representation of the second component, which identifies the beginning and the end of the decisional command and clause, and whether it is a repeat or conditional clause. This can be simply the letter C for conditional clause, the letter E for the end of a conditional clause, an R for a repeat clause, and an F for the finish of the repeat clause. The decision index also may record the offset position in the text of the decisional command clause, which is a number representing the count from the beginning of the document to the beginning of the clause and from the beginning of the document to the end of the clause.

Figure 1:
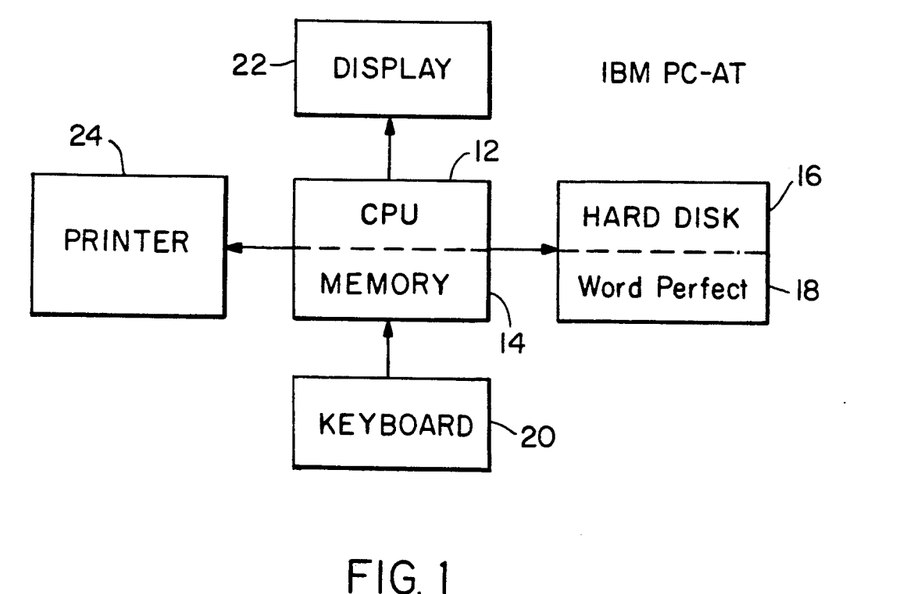
FIG. 1 is a block diagram of a computer system that can be used to accomplish this invention including a word processor stored on its hard disk.

The document assembly customization system according to this invention can be implemented on a computer system 10, FIG. 1, which includes a CPU 12 with a memory 14. There is a conventional hard disk 16 which includes a word processor such as Word Perfect 18. The keyboard 20 can be used to control CPU 12 and there is a display 22 and a printer 24. Computer system 10 may be implemented by a conventional PC type computer such as an IBM personal computer.

Figure 2:
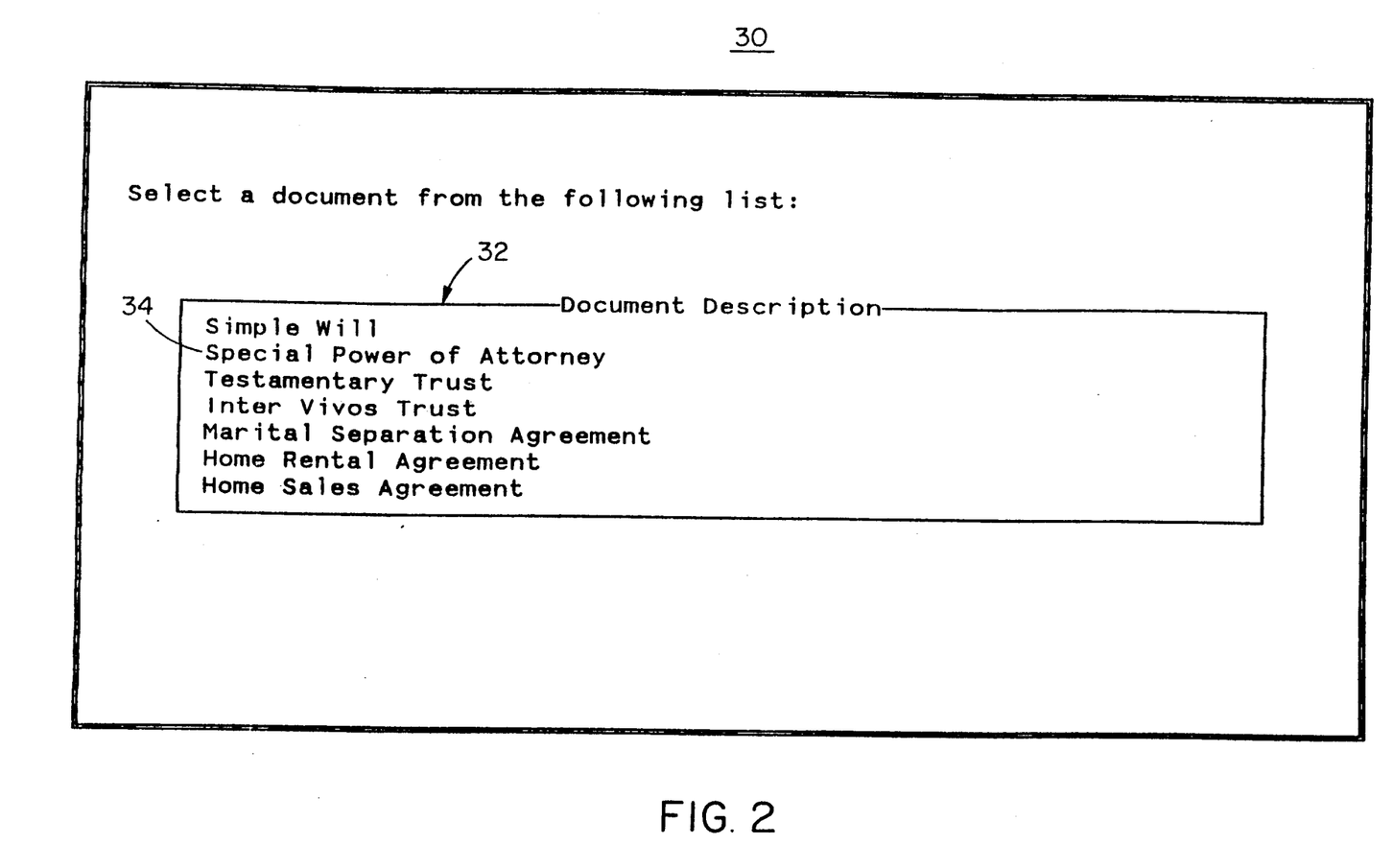
FIG. 2 is an illustration of an initial screen from which the user can choose a modified source instrument which has been customized using the word processor and create from the modified source instrument a new template and decision index.
Figure 3:
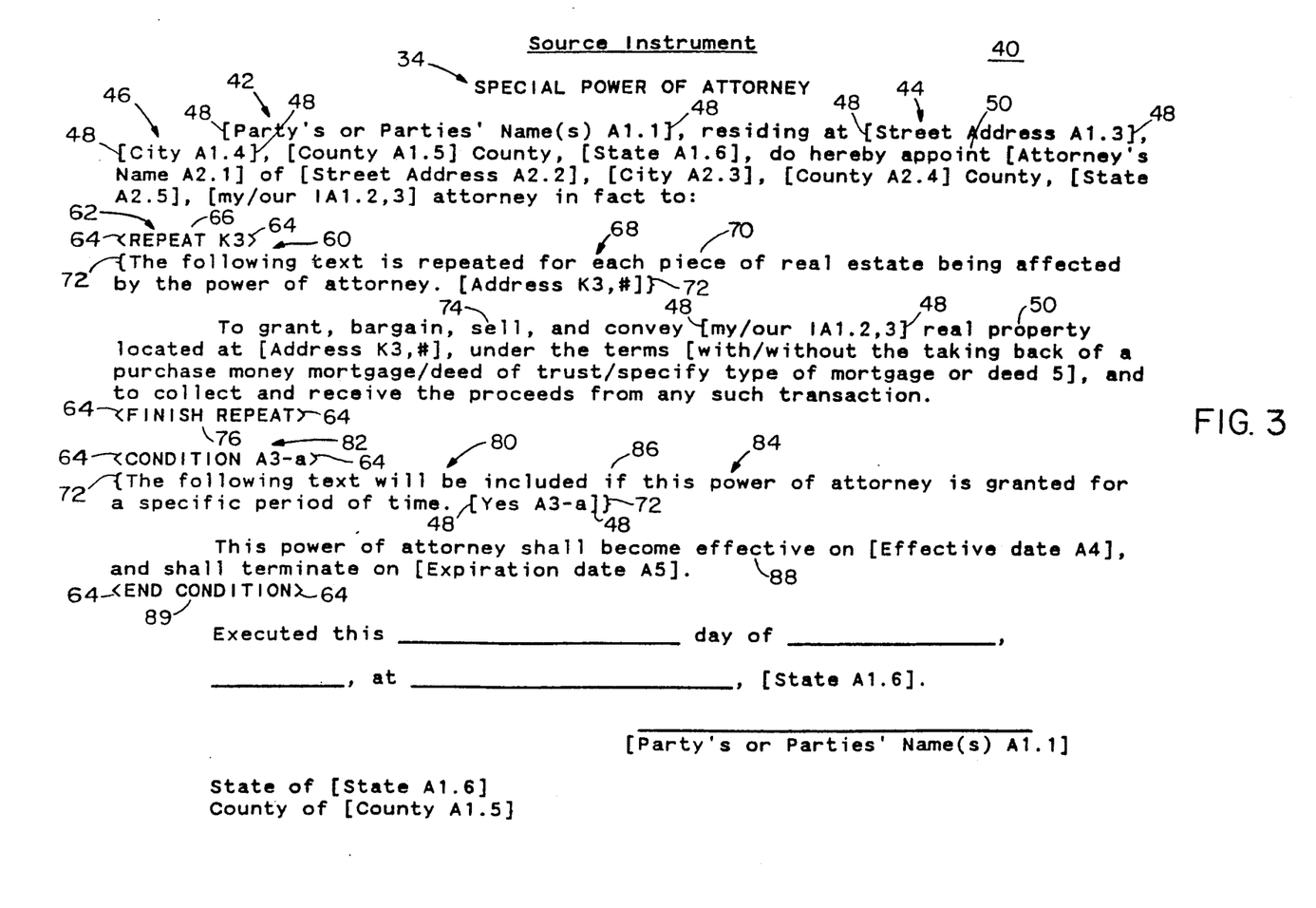
FIG. 3 is a replica of the original source instrument to be modified using the word processor.

After the user attorney has modified the source instrument in some way using the word processor, he then calls the instrument up to create the template and the decision index. This is done for example by referring to the screen 30 in FIG. 2, which presents a list 32 of possible documents that the attorney may wish to call. In this example the attorney calls Special Power of Attorney 34. The original source instrument 40 is shown in FIG. 3 as it appears before modification or customization by the user attorney using the word processor. There it can be seen that the Special Power of Attorney 34 includes a number of question blanks 42, 44, 46 indicated by square brackets 48 at the beginning and end of each question blank.

In between the question blanks is ordinary text 50. Such question blanks surrounded in brackets appear throughout the instrument. Also appearing in source instrument 40 are decisional commands and clauses. There is a repeat decisional clause and command 60 which includes the repeat command 62 indicated by angle brackets 64 and containing the first component, that is, the word repeat, 66 which indicates that this is the beginning of a repeat command. Following repeat command 62 is repeat clause 68 which includes a comment part 70 contained within braces 72, and the actual repeat provision 74, at the end of which appears the remainder of the second part of the component 76 which includes angle brackets 64 containing the phrase "finish repeat" indicating that this is the end of the repeat clause.

Figure 4:
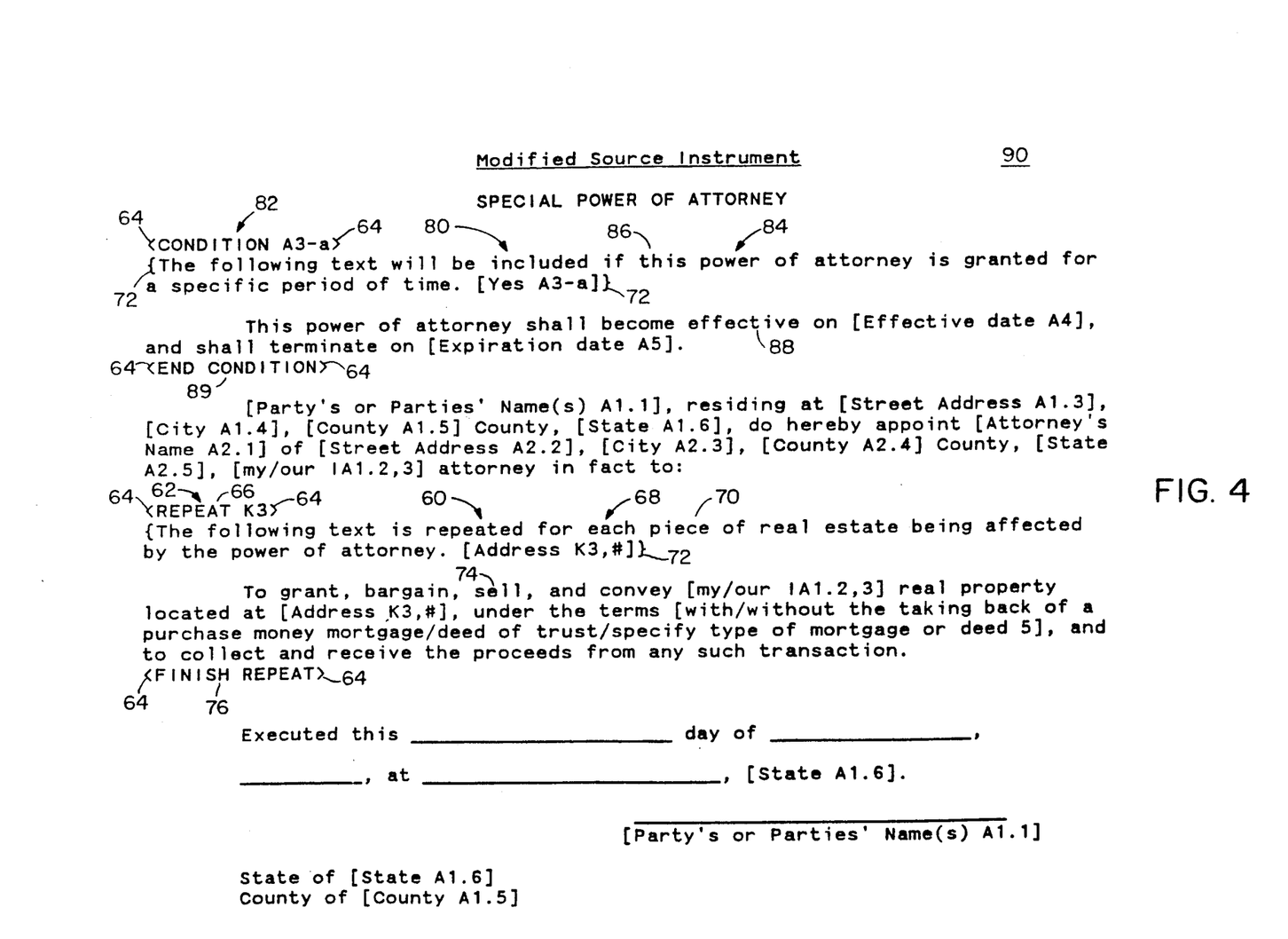
FIG. 4 is the modified source instrument after the customization using the word processor.

Following this in original source instrument 40 is the second decisional command 80, which is a conditional command that includes the condition command 82 and the conditional clause 84. Conditional command 82 again includes angle brackets 64 surrounding the word "condition", which indicates the start of a conditional clause. The numbers A3-a following the word "condition" and the number K3 following repeat 66 identify the questions that invoke the decision, as explained more fully in the parent U.S. patent application Ser. No. 07/625,881 referred to previously. Following condition command 82, condition clause 84 includes a decisional comment 86 contained in braces 72, followed by the decisional provision 88 itself. At the end of clause 84 the syntax symbol appears again with the angle brackets 64 surrounding the phrase "end condition" 89 which indicates the end of a conditional decision command end clause. If the user attorney is unhappy with the structure of source instrument 40 he may modify this using the word processor 18, for example, to switch the position of the conditional command clause 80 and the repeat command clause 60, so that the instrument now appears as the modified source instrument 90, FIG. 4, where the conditional command and clause 80 occurs first and the repeat command and clause 60 appears second in the body of instrument 90.

Figure 5:
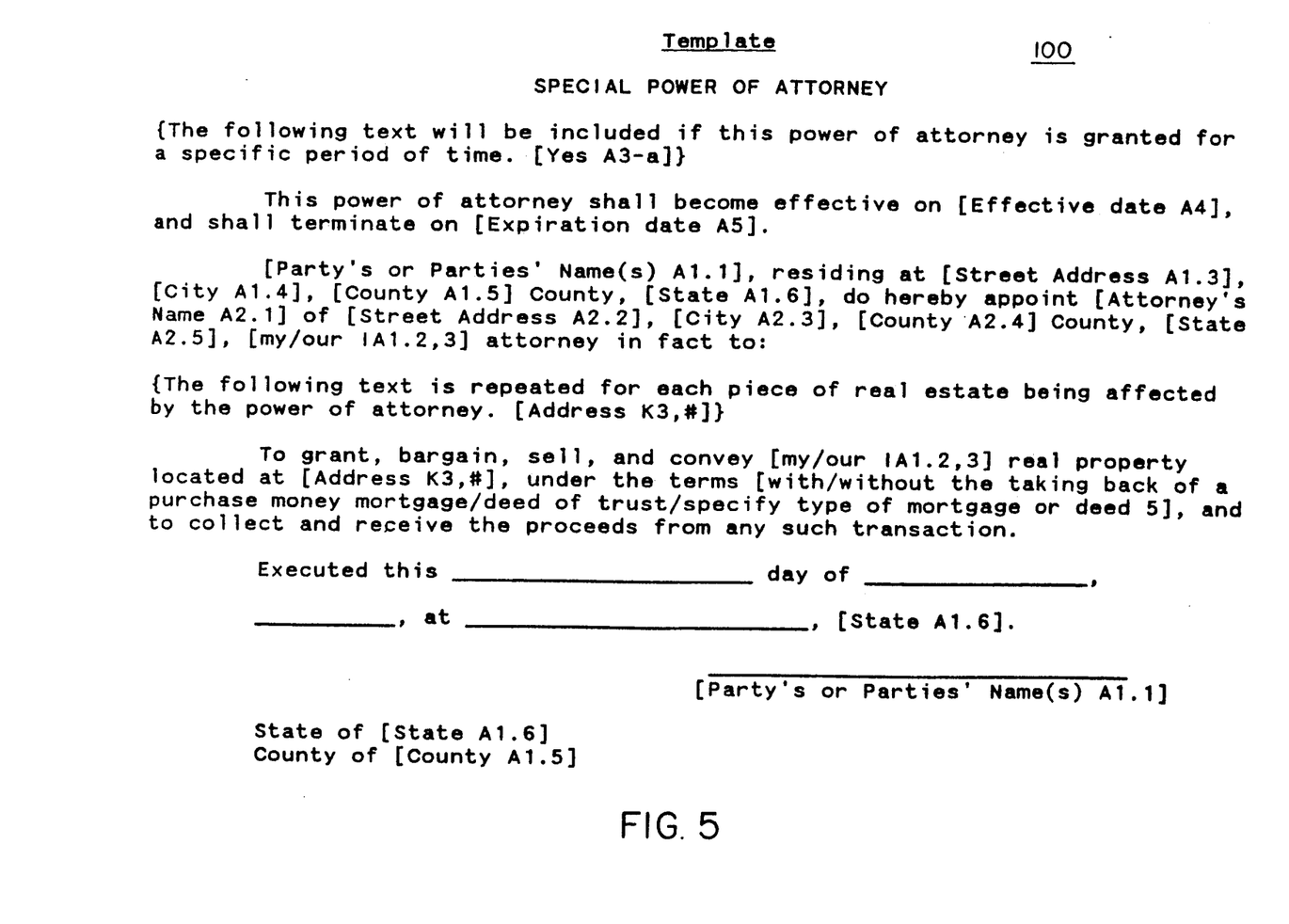
FIG. 5 is the template that results from the customization which the ultimate user can use in the document editing system.

In accordance with this invention then, the template 100, FIG. 5, is formed and can be recalled repeatedly by the user attorney whenever he wishes to use that Special Power of Attorney that he has customized for his use in office. Now the template 100 may be used in the normal way by simply answering the questions and responding to the decisional requirements as with any other document editor or assembly system. While automatically preparing this template, the system also automatically prepares the decision index 110 of FIG. 6. Since there are only two conditional clauses and they run in serial, that is, one starts and finishes before the next one starts and finishes, the decision index is a very simple tabulation. For example, the beginning of the conditional command and clause is identified simply by the letter C, 112. The question upon which the condition relies is indicated at 114 by the coding A3-a, and the beginning of the conditional command and clause occurs at the fifty-third position in the text of the template as indicated by the number 53 at location 116. The number 2, item 118, indicates that this conditional command and clause ends at the second position in the index. This can be seen clearly by the occurrence of the letter E which indicates the end of the conditional clause. The place where the end of the conditional clause occurs is location 287 as indicated at 122, and the conditional clause is signified as having begun at the first position by the 1 indicated at 124.

Figure 6:
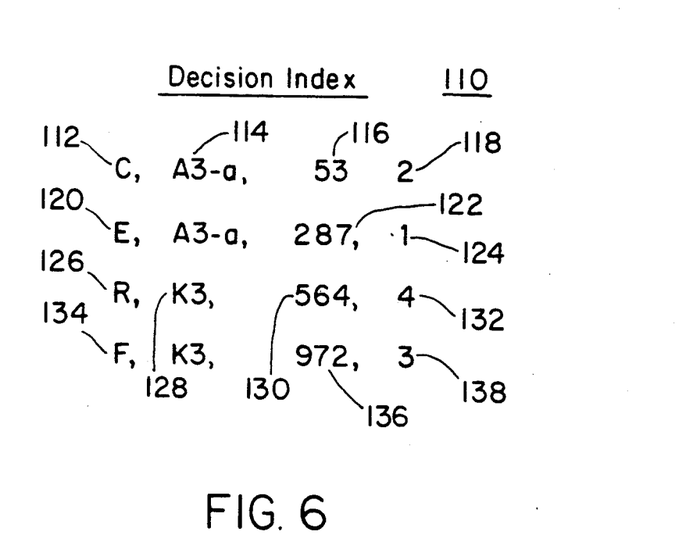
FIG. 6 is a decision index which is automatically created by the system to record the positions of the decisional clauses in the text.

In a similar manner, the repeat clause is indicated as beginning by the letter R at 126, K3 at 128 indicates the position of the question on which the conditional response relies. The number 564 at 130 indicates the beginning of the repeat command and clause, and the numeral 4 at 132 indicates that the repeat command and clause will end at the fourth position in the index. Finally, the letter F at position 134 indicates the end of the repeat clause, the number 972 at 136 indicates the location in the text where the repeat command or clause ends, and the numeral 3 at 138 indicates that the repeat clause began at the third position in the decision index.

Of course, much more complex decision indices would occur when there are a number of conditional and repeat commands used and they are interleaved, cascaded or nested one in the other, as explained more fully in the parent application.

Figure 7:
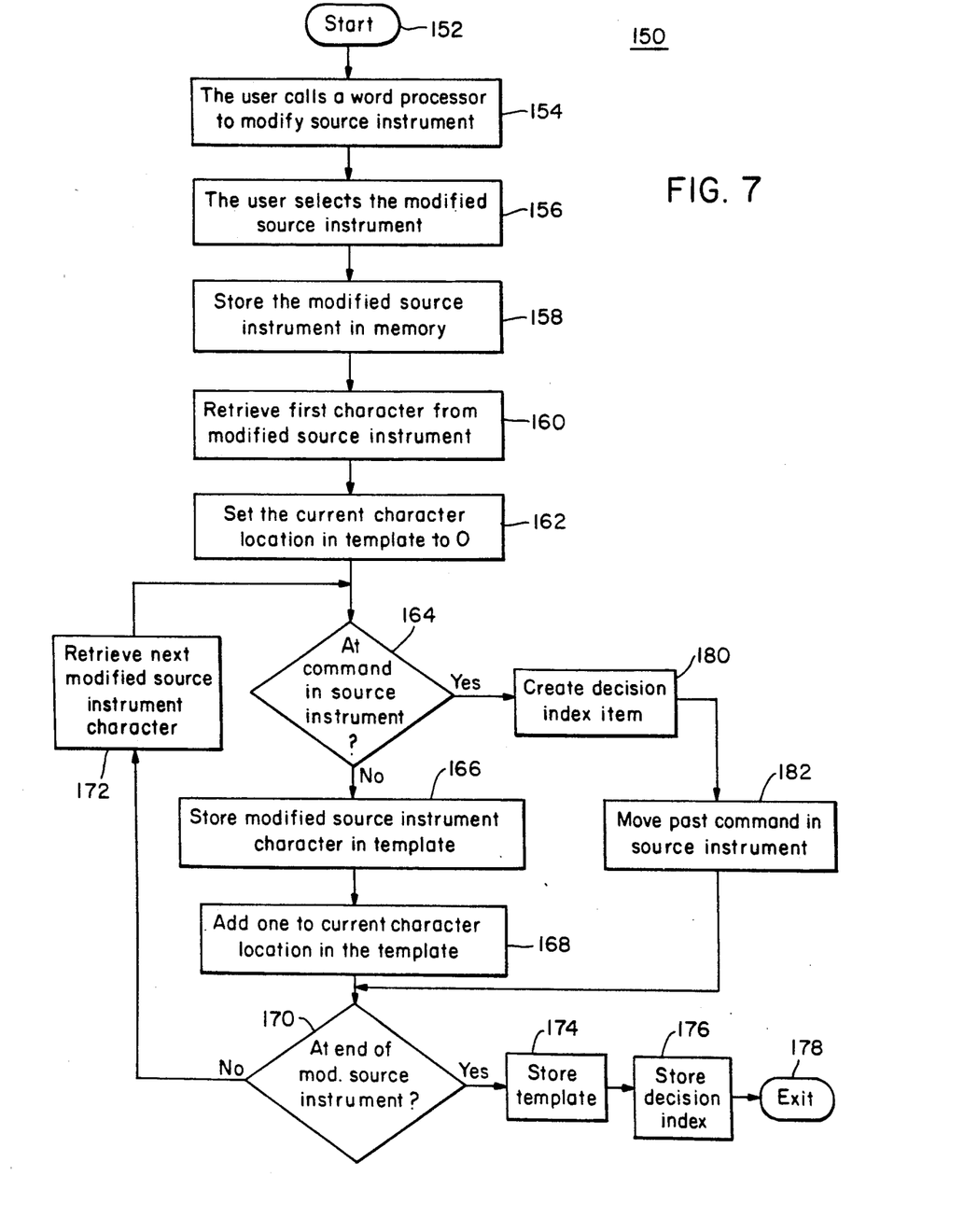
FIG. 7 is a functional flow chart of the software which creates the template and decision index for the modified source instrument according to this invention.

Each line of the decision index is called a decision item, or index item. The position numbers 118, 124, 132, 138 of the items in the index are called simply the index numbers. The software which creates a decision index and the template customization system 150, FIG. 7, begins at start 152. The user in step 154 calls the word processor 18 to modify the source instrument 40. In step 156 the user then selects the modified source instrument 90 from screen 30, FIG. 2. The modified source instrument is stored in memory, step 158, and the first character is retrieved from the modified source instrument in step 160. This operation is disclosed in more detail in the parent application specifically with respect to FIG. 17 therein. The current character location in the template is set to 0 in step 162 and then inquiry is made as to whether the system is now at a decisional command in the source instrument in step 164. If the response is negative, then in step 166 the modified source instrument character is stored in the template 100, FIG. 5. One is added to the current character location in the template in step 168 and the inquiry is made in step 170 as to whether the system is at the end of the modified source instrument. If it is not, then in step 172 the next modified source instrument character is retrieved and the system returns to step 164. If the system is at the end of a modified source instrument, then the template is stored in step 174. The decision index is stored in step 176, and the routine is exited in step 178. If the answer is in the affirmative, at the time the inquiry is made in step 164 as to whether there is a decisional command in the source instrument, then the decision index 110, FIG. 6, is created in step 180. After this, the system moves past the decision command in the source instrument, step 182, and returns to the inquiry in step 170.

Figure 8:
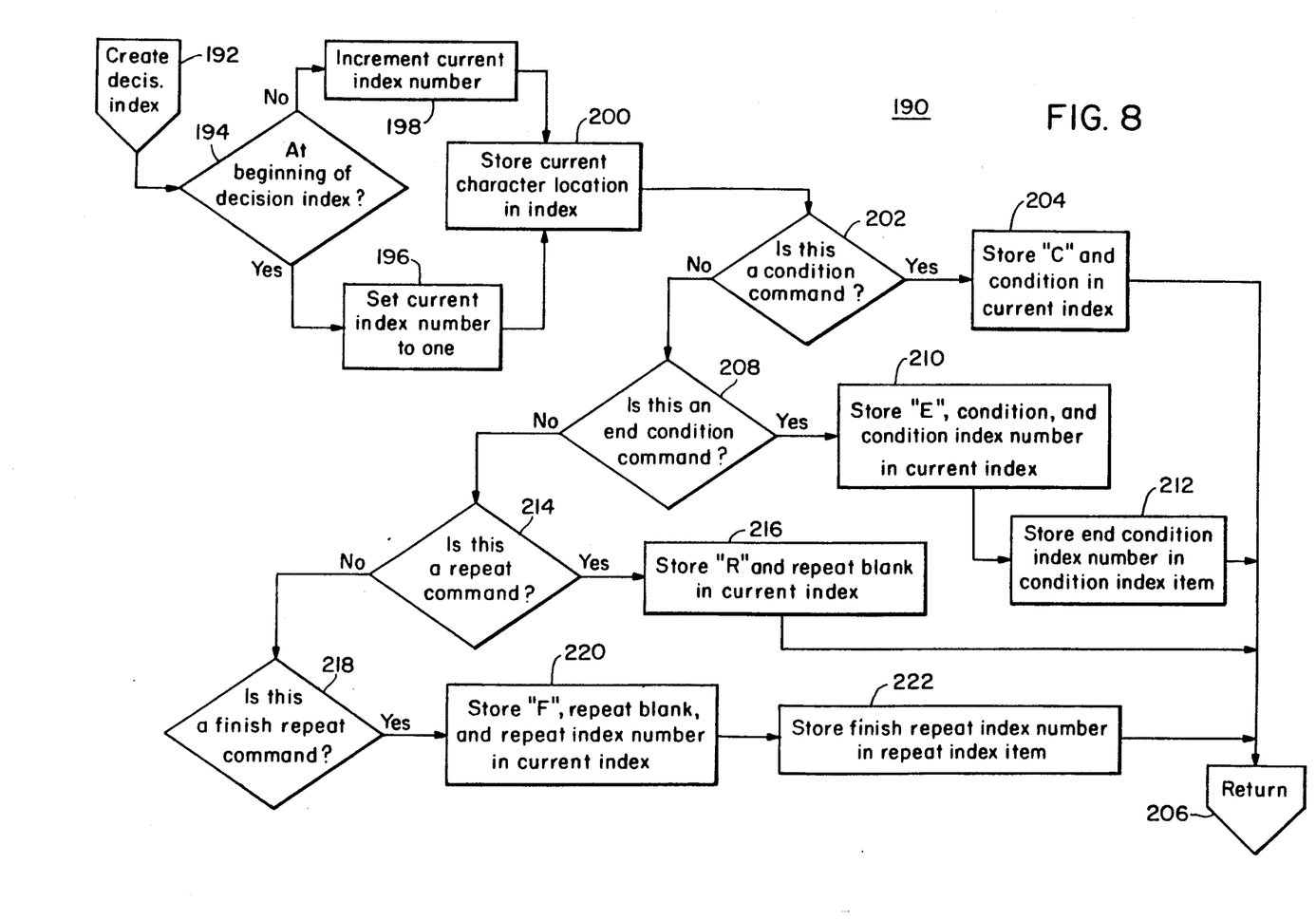
FIG. 8 is a more detailed functional flow chart of the routine that creates the decision index in FIG. 7.

The operation of creating the decision index item in step 180 is the subject of a more detailed routine 190, FIG. 8, where the operation of creating a decision index 192 begins with the inquiry as to whether the system is at the beginning of the decision index 194. If it is, the current index number is set to 1, step 196. If it is not, then in step 198 the current index number is simply incremented. The current index numbers are the numbers 118, 124, 132 and 138 in FIG. 6. Following either occurrence, the current character location is stored in the index in step 200. The current character location is the point which the system has reached in the template text. These are the numbers 53, 287, 564 and 972 indicated at 116, 122, 130 and 136. Following this the inquiry is made in step 202 as to whether this is a condition command. If it is, then in step 204 the C is stored in the current index. This is the C 112 in FIG. 6. Following this the system returns, step 206, to the main system routine 150 shown in FIG. 7. If this is not a condition command, then inquiry is made in step 208 as to whether this is an end condition command. If it is, then in step 210 an E 120, FIG. 6, is stored, and a condition index number is also stored in the current index. In this case the current index number is the number 1 shown at 124 in FIG. 6. Following this in step 212 the end condition index number 2, shown at 118 in FIG. 6, is stored. If in step 208 it was determined that the system was not at an end condition command, then inquiry is made at step 214 as to whether this is a repeat command. If it is, then in step 216 the system stores an R 126, FIG. 6, and the repeat blank represented by K3 indicated at 128 in FIG. 6, and then the system returns in step 206 to the main system routine 150, FIG. 7. If this was not a repeat command, then in step 218 inquiry is made as to whether this is a finish repeat command. If it is, then in step 220 the letter F 134, FIG. 6, is stored along with the repeat blank K3, and the index number 3 indicated at 138, FIG. 6. Following this, in step 222 the finish repeat index number 4, shown at 132 in FIG. 6, is stored.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A document assembly customization system for modifying a source instrument including text and decisional commands and their associated decisional clauses, comprising:
   means for indicating each decisional command and its associated decisional clause in the instrument;
   means for moving and deleting decisional commands and their associated decisional clauses;
   means for generating a new template from the ) modified source instrument; and
   means for generating a decision index identifying each decisional command and its associated decisional clause and their location in the text of the modified source instrument.

2. The document assembly customization system of claim 1 further including means for adding and deleting words in the text.

3. The document assembly customization system of claim 1 in which said source instrument includes question blanks to be answered and there is further included means for indicating each question blank in the instrument and means for moving and deleting said question blanks.

4. The document assembly customization system of claim 1 in which said means for indicating each decisional command and clause includes first syntax symbol means accompanying each decisional command.

5. The document assembly customization system of claim 3 in which said means for indicating each question blank includes second syntax symbol means accompanying each question blank.

6. The document assembly customization system of claim 1 in which said means for moving and deleting decisional commands includes a word processor.

7. The document assembly customization system of claim 4 in which said first syntax symbol means includes a first component identifying a decisional command and a second component for selectively identifying the beginning and the end of the decisional command and clause and identifying the command as one of a repeat clause or a conditional clause.

8. The document assembly customization system of claim 7 in which said means for generating a decision index includes means for storing a representation of said second component identifying the beginning and end of the command and clause and whether the clause is a repeat or conditional clause.

9. The document assembly customization system of claim 8 in which said means for generating a decision index further includes means for recording in the text the offset position of the decisional command clause in the text.

10. The document assembly customization system of claim 9 in which said means for recording the offset position defines both the beginning and end in the text of the decisional command clause represented by the decisional command.

* * * * *